(12) United States Patent
Manzo et al.

(10) Patent No.: US 12,734,558 B2
(45) Date of Patent: Sep. 15, 2026

(54) AUTOMATED GUIDED VEHICLE CHARGE SHOE CLEANER

(71) Applicant: Lincoln Global, Inc., Santa Fe Springs, CA (US)

(72) Inventors: Ryan Manzo, Macomb, MI (US); Calvin Shaw, Waterford, MI (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 523 days.

(21) Appl. No.: 18/224,103

(22) Filed: Jul. 20, 2023

(65) Prior Publication Data

US 2025/0025921 A1 Jan. 23, 2025

(51) Int. Cl.
*B08B 1/20* (2024.01)
*B60L 53/31* (2019.01)

(52) U.S. Cl.
CPC ................ *B08B 1/20* (2024.01); *B60L 53/31* (2019.02)

(58) Field of Classification Search
CPC ..... B60L 53/31; B08B 1/20; G05B 19/41895; G01S 15/04; G05D 1/00; B60S 3/00
USPC ............................................ 15/308; 700/245
See application file for complete search history.

(56) References Cited

U.S. PATENT DOCUMENTS

| | | | |
|---|---|---|---|
| 10,642,277 | B2 | 5/2020 | Diehr et al. |
| 2021/0146889 | A1 | 5/2021 | Kuehne et al. |

FOREIGN PATENT DOCUMENTS

| | | | |
|---|---|---|---|
| CN | 207238566 | U | 4/2018 |
| CN | 214450397 | U | 10/2021 |
| CN | 217623489 | U * | 10/2022 |
| EP | 3 957 524 | A1 | 2/2022 |

* cited by examiner

*Primary Examiner* — Katina N. Henson
(74) *Attorney, Agent, or Firm* — Brad C. Spencer

(57) ABSTRACT

A charging contact cleaner for an automated guided vehicle (AGV) includes a charging contact cleaning station located along a travel path of one or more AGVs. The charging contact cleaning station has at least one cleaning brush, and an actuator operatively connected to the at least one cleaning brush. The at least one cleaning brush simultaneously engages first and second charging contacts deployed from the AGV at the charging contact cleaning station. The at least one cleaning brush is automatically moved by the actuator relative to the first and second charging contacts for a predetermined cleaning duration to clean respective surfaces of the first and second charging contacts.

26 Claims, 9 Drawing Sheets

54
44
44
52
56
66
58
34

AUTOMATED GUIDED VEHICLE CHARGE SHOE CLEANER

BACKGROUND OF THE INVENTION

Field of the Invention

The present invention relates to automated guided vehicles (AGVs), and in particular to automatic AGV charging contact cleaners and AGV fleet systems employing such cleaners.

Description of Related Art

AGVs are used in commercial and industrial facilities for moving parts and inventory between physical locations in the facility. They typically include on-board (battery) power and steering systems to enable autonomous navigation using any of the number of known techniques. Some AGVs include a wireless communication device (WCD) by which the AGV may be commanded and/or polled by a computer-based supervisory system that is typically located within the same facility. Battery-powered AGVs must be recharged periodically and typically include charging contacts for receiving charging current at a charging station. The charging contacts can be deployable from the AGV when at the charging stations. For example, the charging contacts can be located on a charge shoe that can be extend outward or downward from the AGV chassis for electrical connection to a charge pad at the charging station. After charging, the charge shoe can be retracted back toward the AGV chassis. The charging contacts collect debris over time, which can cause a poor electrical connection between the charging contacts and the charge pad. Accordingly, the charging contacts must be manually cleaned periodically, which is time consuming. It would be desirable to eliminate the need to manually clean the charging contacts on AGVs, particularly in facilities employing many AGVs.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a charging contact cleaner for an automated guided vehicle (AGV). The charging contact cleaner includes a charging contact cleaning station located along a travel path of one or more AGVs. The charging contact cleaning station has at least one cleaning brush, and an actuator operatively connected to the at least one cleaning brush. The at least one cleaning brush simultaneously engages first and second charging contacts deployed from the AGV at the charging contact cleaning station. The at least one cleaning brush is automatically moved by the actuator relative to the first and second charging contacts for a predetermined cleaning duration to clean respective surfaces of the first and second charging contacts.

In accordance with another aspect of the present invention, provided is a charging contact cleaner for an AGV. The charging contact cleaner includes a charging contact cleaning station located along a travel path of one or more AGVs and recessed in a floor on which the AGV travels. The charging contact cleaning station includes a flush-to-floor enclosure, at least one cleaning brush located within the flush-to-floor enclosure, and an actuator located within the flush-to-floor enclosure and operatively connected to the at least one cleaning brush. The at least one cleaning brush simultaneously engages first and second charging contacts deployed from the AGV at the charging contact cleaning station. The at least one cleaning brush is automatically moved by the actuator relative to the first and second charging contacts to clean respective surfaces of the first and second charging contacts.

In accordance with another aspect of the present invention, provided is an AGV fleet system that includes a plurality AGVs located within a facility, each AGV having first and second deployable charging contacts for receiving charging current to charge a battery of the AGV. The AGV fleet system further includes a charging contact cleaning station located along a travel path of the plurality of AGVs within the facility, and a facility supervisory system in communication with the plurality of AGVs and the charging contact cleaning station. The charging contact cleaning station comprises at least one cleaning brush and an actuator operatively connected to the at least one cleaning brush. The facility supervisory system is configured to automatically initiate a cleaning routine by the charging contact cleaning station upon an AGV arriving at the charging contact cleaning station. During the cleaning routine, the at least one cleaning brush simultaneously engages the first and second charging contacts deployed from the AGV, and the at least one cleaning brush is automatically moved by the actuator relative to the first and second charging contacts to clean respective surfaces of the first and second charging contacts.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
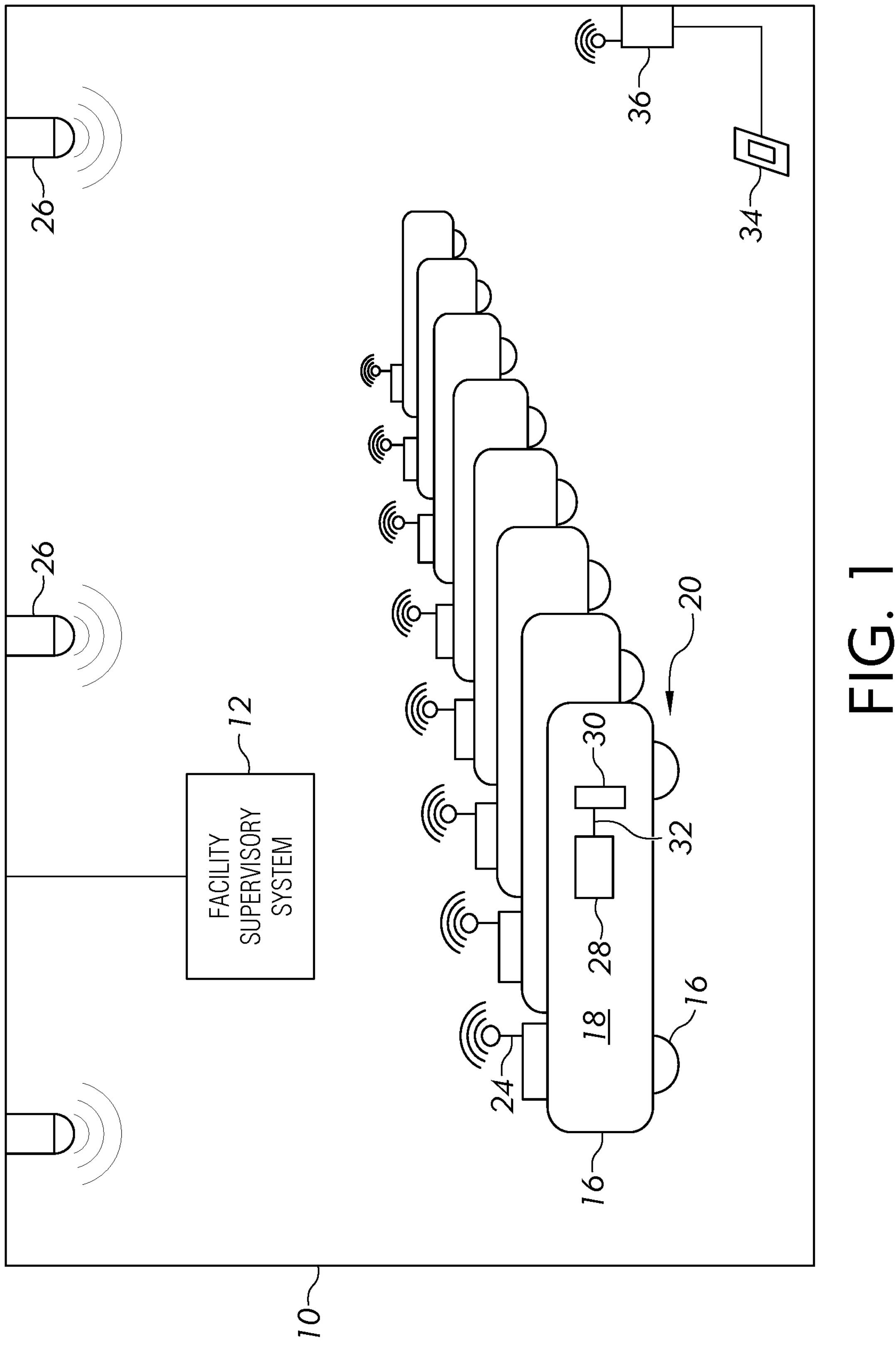
FIG. 1 shows a facility having multiple AGVs.

The present invention relates to charging contact cleaning stations for AGVs. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

FIG. 1 shows a facility 10 having a facility supervisory system 12 and a fleet 14 of individual automated guided vehicles (AGVs) 16. As a matter of general operation, the fleet 14 of AGVs 16 operate during any particular work shift under the coordination of the facility supervisory system 12 to move materials, inventory, and/or production workpieces between locations or stations within the facility. One common such application is the movement of parts being manufactured between various workstations, for which the AGVs may include tooling and/or movable platforms operated by scissor lifts, rigid chains, hydraulics, etc., as is known to those skilled in the art.

Each AGV 16 includes the basic components of a typical AGV, such as a body 18 covering a chassis supporting a plurality of wheels 20, including one or more steerable wheels 22, and one or more servo motors used for steering and driving of the wheels 20 of the AGV. Various approaches for guided control of the path of the AGV 16 are known to those skilled in the art, including in-floor wire tracking and magnetic strip tracking, and such approaches for guided control need not be discussed in detail herein. Each AGV 16 can include at least one control panel that includes a human-machine interface, and one or more antennas 24 for wireless communication between the AGV and the facility supervisory system 12. For that purpose, the facility supervisory system 12 has at least one, but typically a plurality of wireless access points 26 spaced around the facility 10 in the vicinity of the fleet 14. Each of the AGVs 16 further include AGV electronics and control systems that enable the AGV to carry out its desired functions and operability. The construction and integration of the basic AGV components are known to those skilled in the art.

The AGVs 16 are battery powered and each AGV has one or more rechargeable batteries 28. To recharge the batteries 28, the AGV proceeds to a charging station. The AGVs have a charge shoe 30 that is deployable from the AGV to engage the charging station. In particular, the charge shoe 30 has charging contacts for electrical connection at the charging station to receive the charging current. When at the charging station, the AGV 16 deploys its charge shoe 30 to connect to the charger. The AGV 16 includes a charging circuit 32 that can be selectively enabled and disabled by the AGV 16. For example, the charging circuit 32 can be normally open to disconnect the charge shoe 30 from the batteries 28 when the charge shoe is not deployed. The charging circuit 32 can be enabled or closed to connect the charge shoe 30 to the batteries 28 when the AGV is at the charging station and the charge shoe is deployed.

The charging contacts on the charge shoe 30 collect debris over time, which can cause a poor electrical connection between the charging contacts and the charge pad at the charging station. To minimize or eliminate the need to manually clean the charging contacts, the AGV system discussed herein includes a charging contact cleaning station 34 that automatically cleans the charging contacts. The charging contact cleaning station 34 can be located along a typical travel path of the AGV 16 as it moves from station to station. For example, the cleaning station 34 can be located on a travel loop that the AGV 16 makes around the facility 10. The AGV 16 can briefly stop at the cleaning station 34 and deploy its charge shoe 30 so that the respective contact surfaces of the charging contacts are cleaned by the cleaning station. The cleaning process can be quick, such as 60 seconds or less, 30 seconds or less, 15 seconds or less, 10 seconds or less, etc. Once the cleaning routine is finished, the AGV 16 can proceed to its next workstation. The charging circuit 32 of the AGV 16 can be disabled while the charge shoe 30 and its charging contacts are deployed from the AGV during the cleaning routine. This would be in contrast to a deployment of the charge shoe 30 at a charging station in which the charging circuit is closed while the shoe is deployed.

As noted above, various approaches for guided control of the path of the AGV 16 are known to those skilled in the art, including in-floor wire tracking and magnetic strip tracking. The AGV's travel path within the facility 10 can include an indicator, such as an oriented magnetic strip, that is sensed up by the AGV and causes it to stop at the charging contact cleaning station 34. The AGV 16 can determine its arrival at the cleaning station 34 from a near-field communication signal, such as a signal received from an RFID tag located at or near the cleaning station. The AGV 16 communicates its arrival at the cleaning station 34 to the facility supervisory system 12.

The charging contact cleaning station 34 can include a control enclosure 36, which can communicate with the facility supervisory system 12 (e.g., through a wireless access point 26) and/or communicate with the AGV 16. Power for operating the cleaning station 34 can be provided from the control enclosure 36 and can include electrical power and/or pneumatic (air) power. For example, the control enclosure 36 can include air valves for operating a pneumatic actuator at the cleaning station 34 or a relay for operating an electric motor at the cleaning station. The control enclosure 36 can also receive control signals from the charging contact cleaning station 34, such as position feedback (e.g., limit switch) signals. In certain embodiments, the control enclosure 36 can initiate a cleaning routine without instructions from the facility supervisory system 12, such as upon an AGV 16 communicating its arrival at the cleaning station 34 to the control enclosure 36. In further embodiments, the facility supervisory system 12 automatically initiates the cleaning routine by the charging contact cleaning station 34 upon the AGV 16 arriving at the cleaning station and communicating its arrival to the facility supervisory system 12. The cleaning routine can have a short, predetermined cleaning duration (e.g., 10 seconds)

that is programmed in the facility supervisory system 12 or in a controller at the control enclosure 36. The duration of the cleaning routine could also be based on how soiled the charging contacts of the charge shoe 30 are. For example, the conductivity of the charging contacts could be determined and the cleaning duration could be based on the conductivity, or images of the charging contacts could be captured and used to determine when cleaning is complete or how long the cleaning routine should last. In any case, once the cleaning routine is complete, the facility supervisory system 12 can instruct the AGV 12 to proceed to its next workstation.

Figure 2:
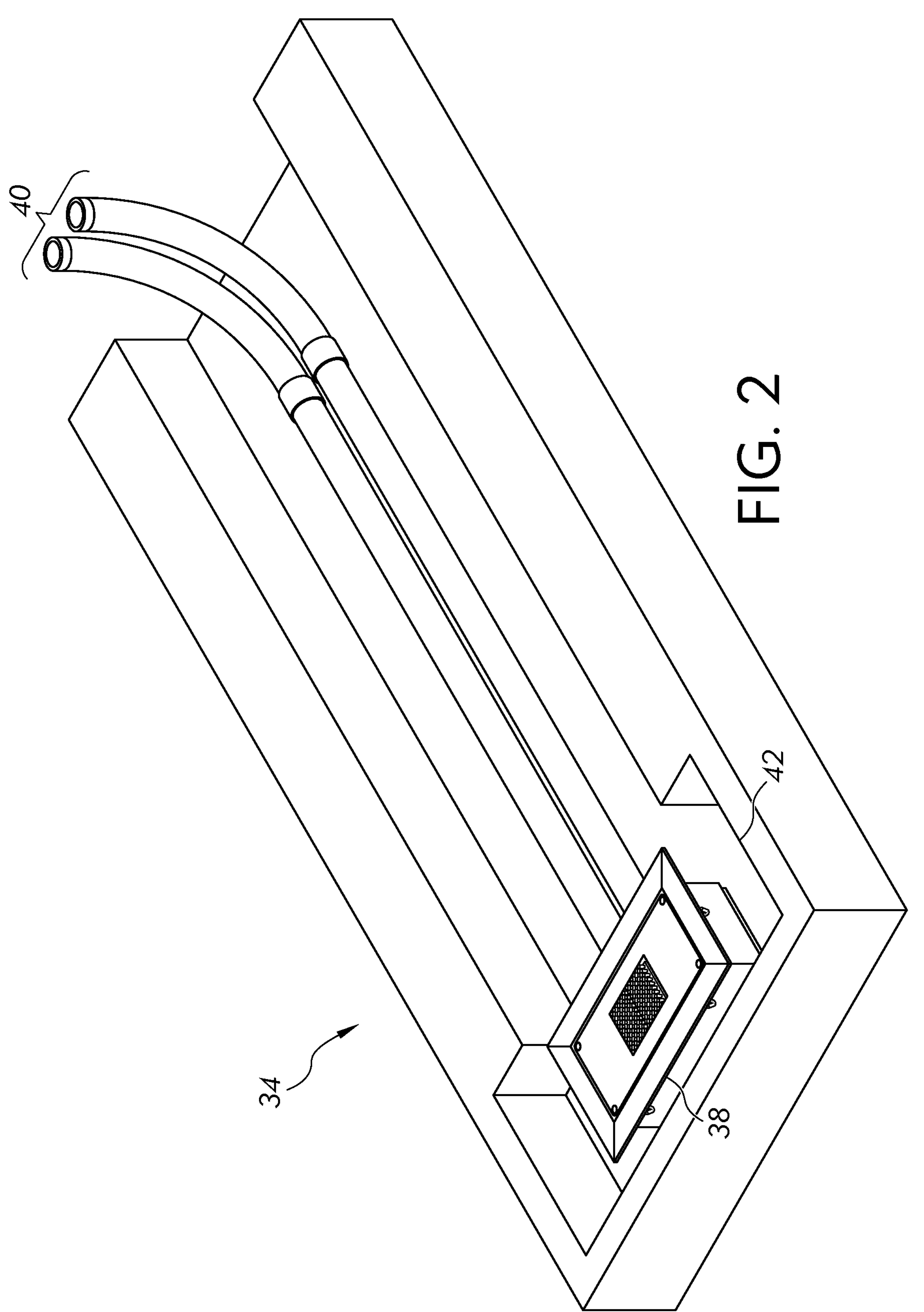
FIG. 2 shows an AGV charging contact cleaning station located in a facility floor.

Depending on how the charge shoe 30 deploys from the AGV 16, for example either laterally (horizontally) from the AGV or vertically (downward) toward the facility floor on which the AGV travels, the charging contact cleaning station 34 can either be mounted above the finished floor (e.g., on a stand or on a structural column or wall) or within an enclosure placed in the floor substantially flush with the finished floor. FIG. 2 shows a charging contact cleaning station located along a travel path of one or more AGVs and recessed in a floor on which the AGV travels. The cleaning station 34 includes a flush-to-floor enclosure 38 the top of which can be installed flush or substantially flush with the finished floor of the facility. To install the cleaning station 34 in an existing facility, an opening 42 can be cut in the floor for the flush-to-floor enclosure 38 and conduits 40 for air and/or wiring from the control enclosure 36 (FIG. 1). The opening 42 can be backfilled with concrete after the flush-to-floor enclosure 38 and conduits 40 are in place.

Figure 3:
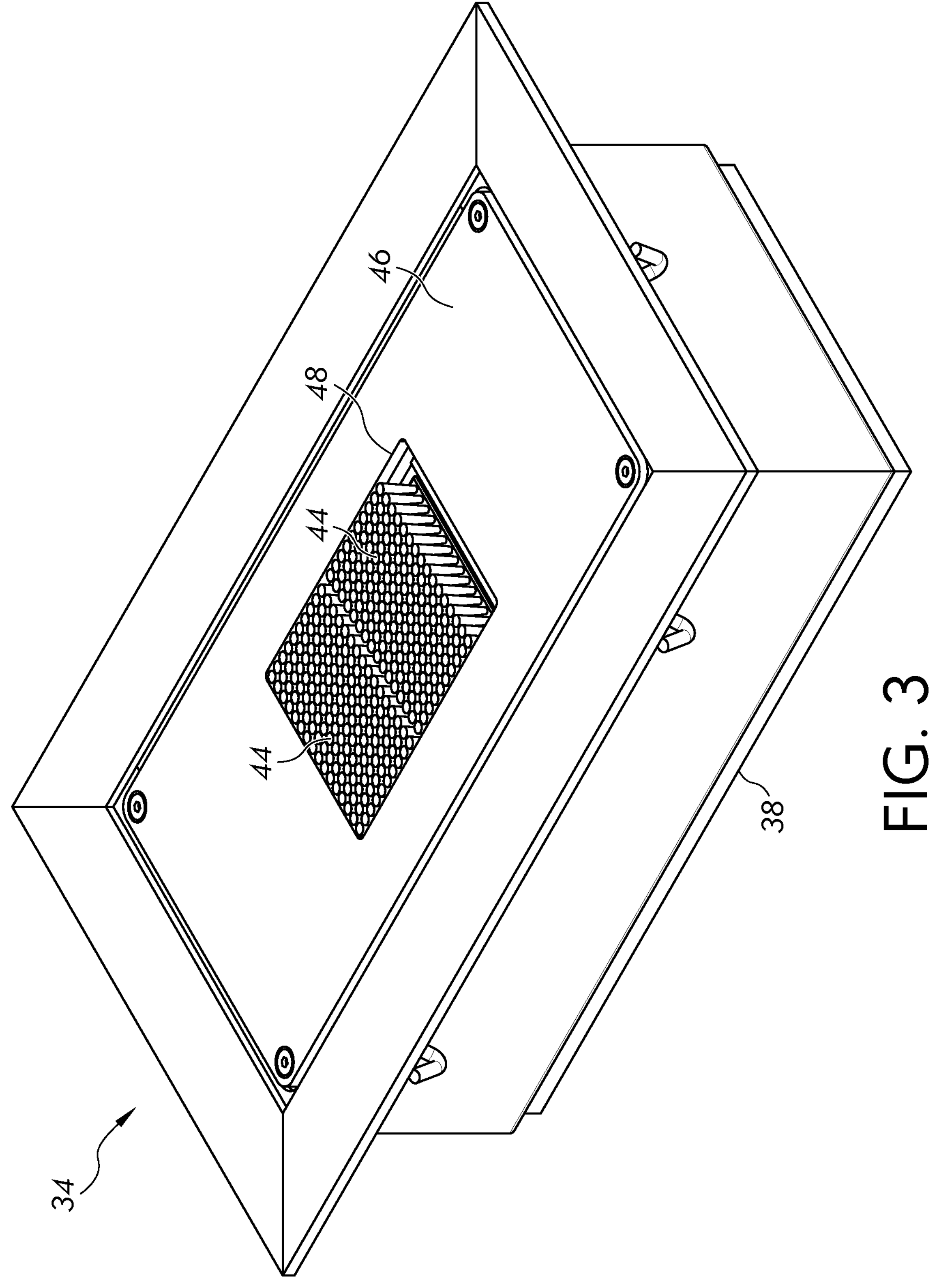
FIG. 3 shows the charging contact cleaning station.

FIG. 3 shows the charging contact cleaning station 34 and flush-to-floor enclosure 38 in further detail. The cleaning station 34 has one or more cleaning brushes 44 located within the enclosure 38. In the example embodiment shown, the cleaning station 34 has two cleaning brushes 44. However, the cleaning station 34 could have a single cleaning brush 44 or more than two cleaning brushes. The flush-to-floor enclosure 38 has a cover plate 46. The cover plate 46 has an opening 48 aligned with the brushes 44 such that the brushes are exposed when the cover plate is attached to the enclosure. When the AGV arrives at the cleaning station 34, it deploys its charge shoe so that its charging contacts are lowered onto the brushes 44. The brushes 44 simultaneously engage the lower surfaces of the charging contacts and are actuated (e.g., moved back and forth, rotated, spun, etc.) so that they move relative to the charging contacts to brush and clean the respective surfaces of the charging contacts. The brushes 44 can have metallic wire bristles, such as brass bristles, or another metallic or nonmetallic material suitable for cleaning the surface of the charging contacts. The brushes 44 can have an electrically-insulating base, such as a plastic base, from which the bristles extend. Moreover, the two brushes 44 can be electrically insulated from each other and each brush can be used to clean a specific one of two charging contacts on the charge shoe of the AGV.

Figure 4:
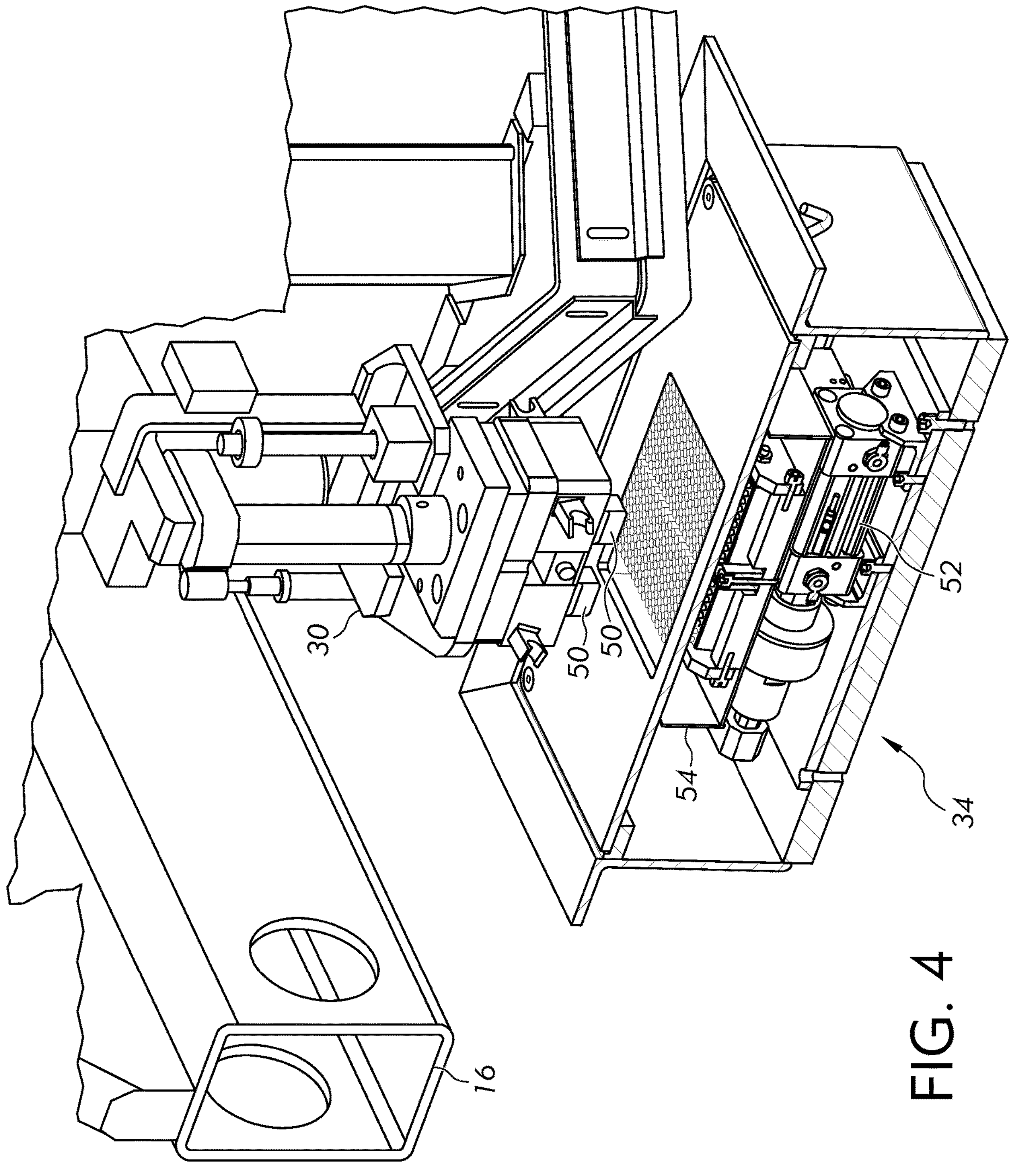
FIG. 4 shows a portion of an AGV located at the charging contact cleaning station.
Figure 5:
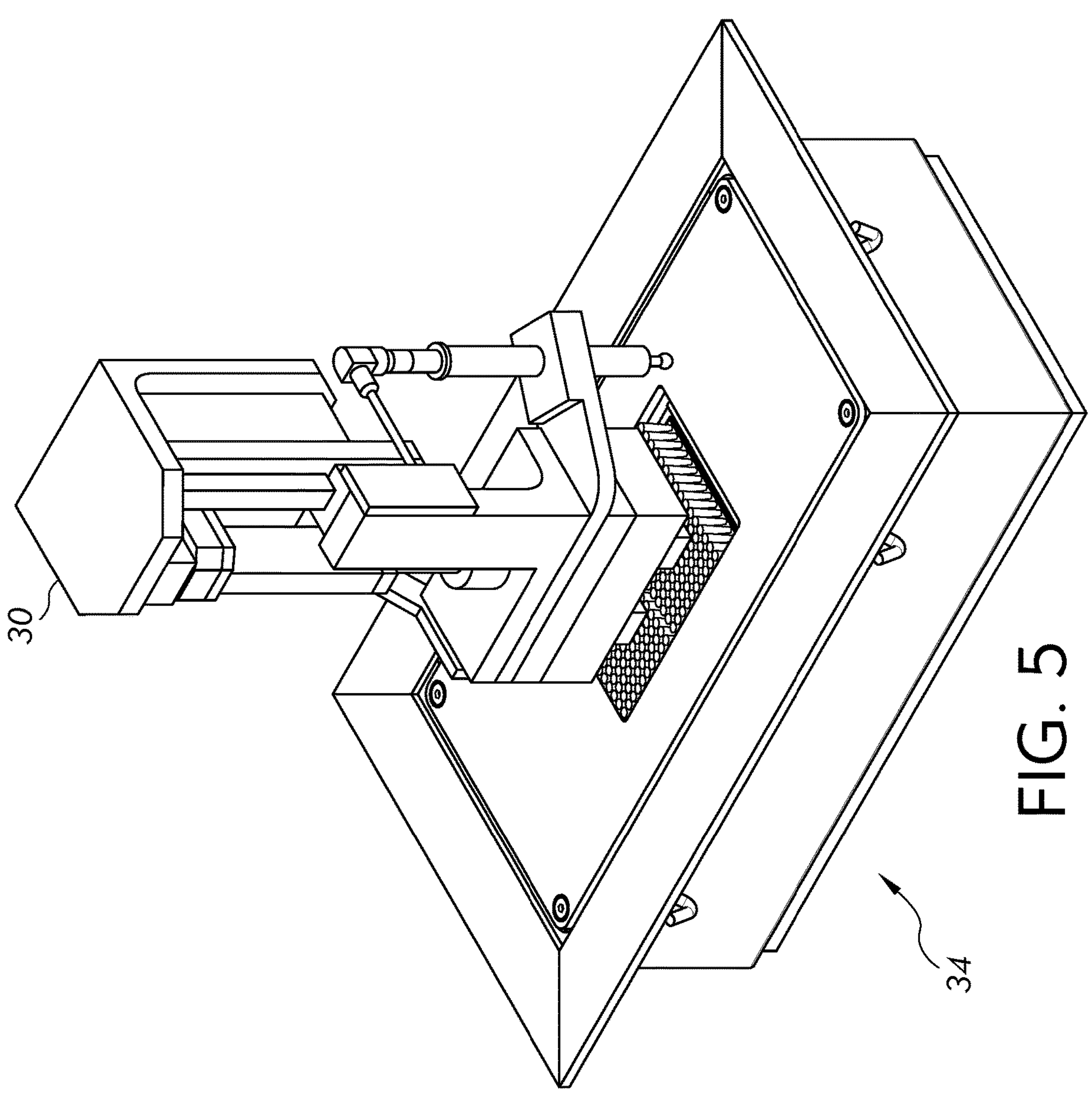
FIG. 5 shows a deployed charge shoe engaged with the charging contact cleaning station.

FIG. 4 shows a portion of an AGV 16 located at the charging contact cleaning station 34. The charge shoe 30 is shown aligned with the cleaning station 34, with the charging contacts 50 located just above the brushes of the cleaning station. In FIG. 4, the charge shoe 30 has not yet been actuated or deployed by the AGV 16 to make contact with the brushes. Some internal components of the cleaning station 34 that are located within the flush-to-floor enclosure can be seen in FIG. 4, such as a pneumatic actuator 52 for moving the brushes back and forth to clean the charging contacts 50, and a debris catch tray 54 that collects debris from cleaning the charging contacts. The brushes can be mounted within the debris catch tray 54. FIG. 5 shows the charge shoe 30 in the deployed position with the charging contacts in contact with the brushes of the cleaning station 34.

Figure 6:
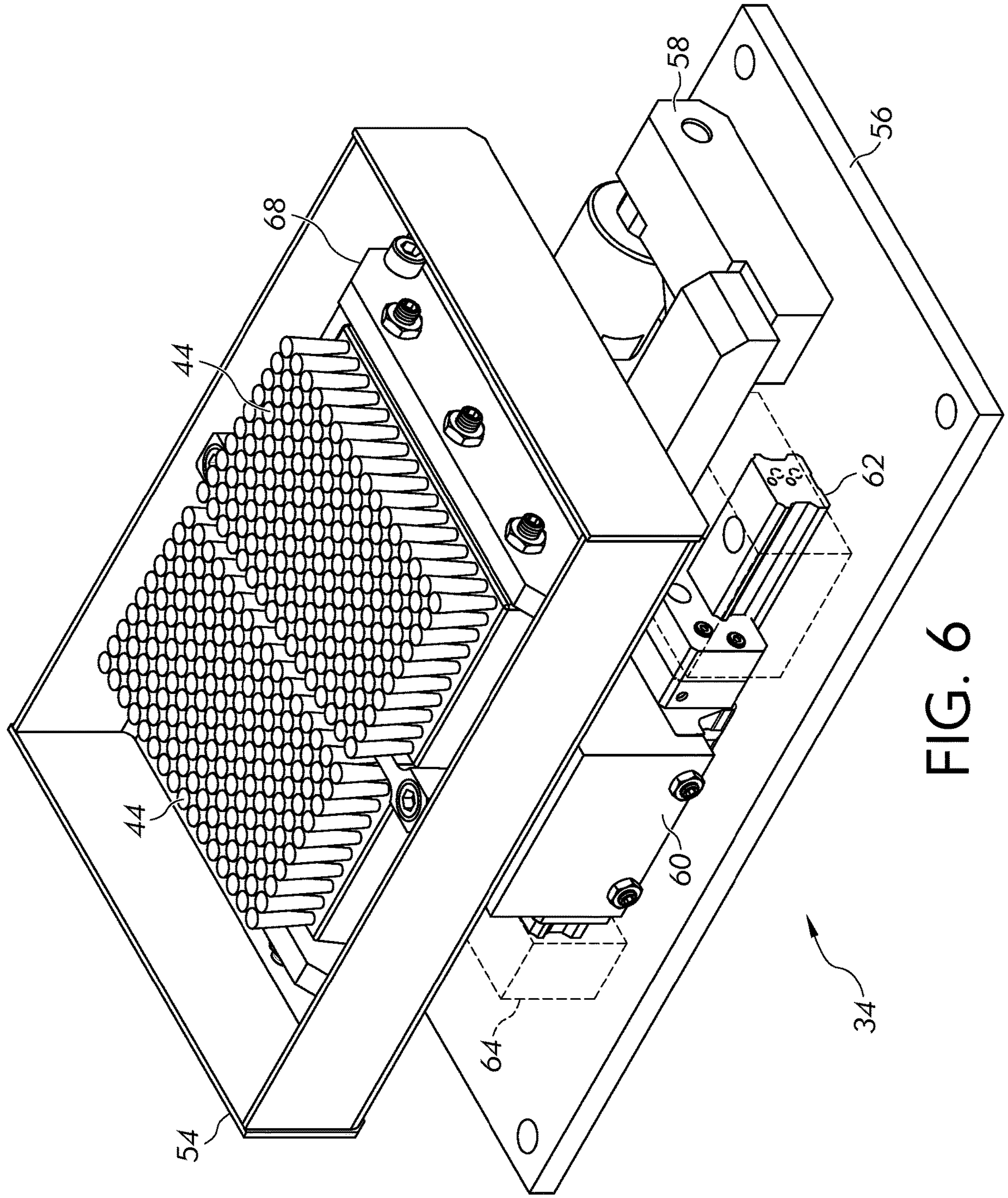
FIG. 6 shows a portion of the charging contact cleaning station.
Figure 7:
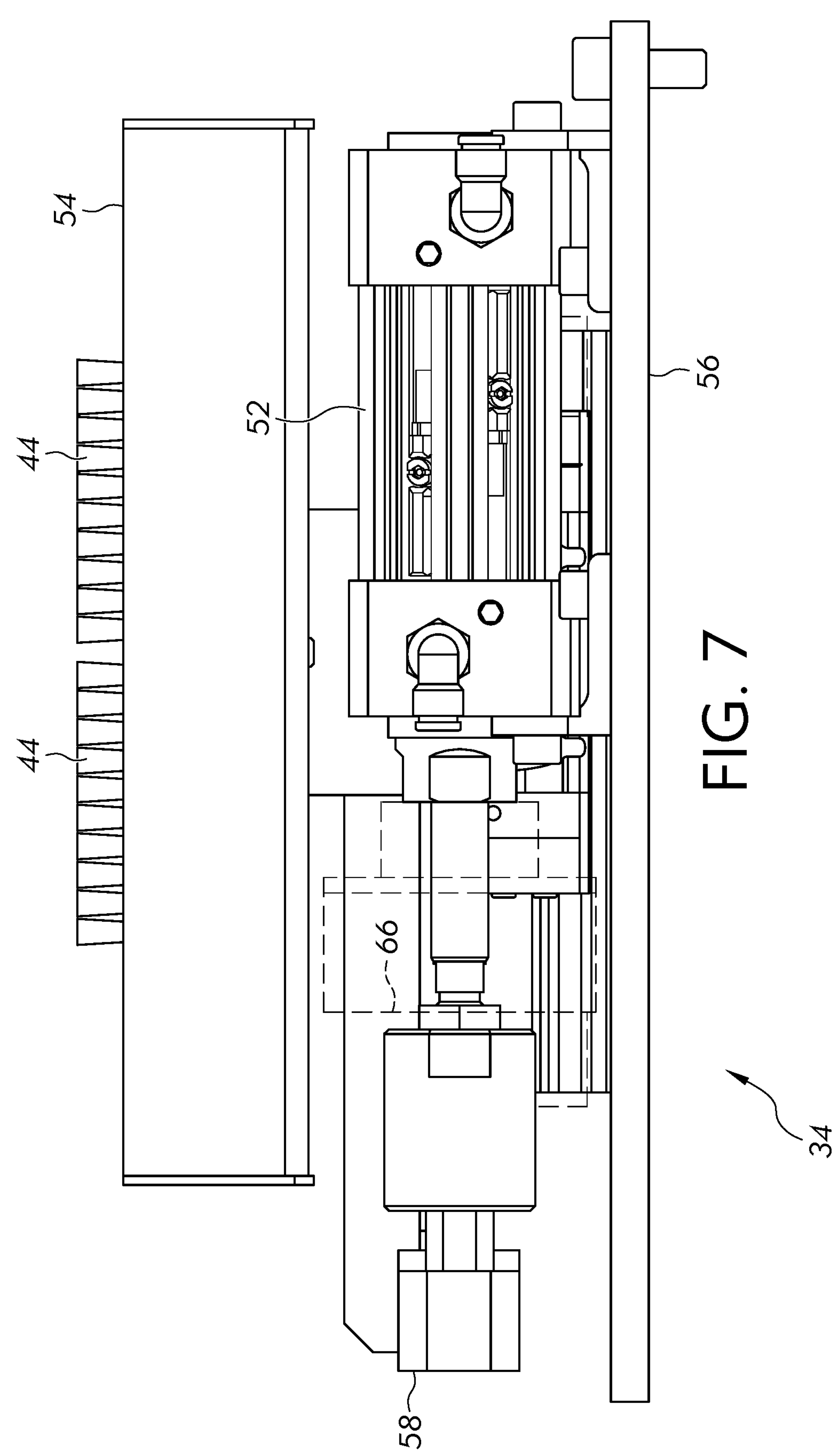
FIG. 7 shows a portion of the charging contact cleaning station.
Figure 8:
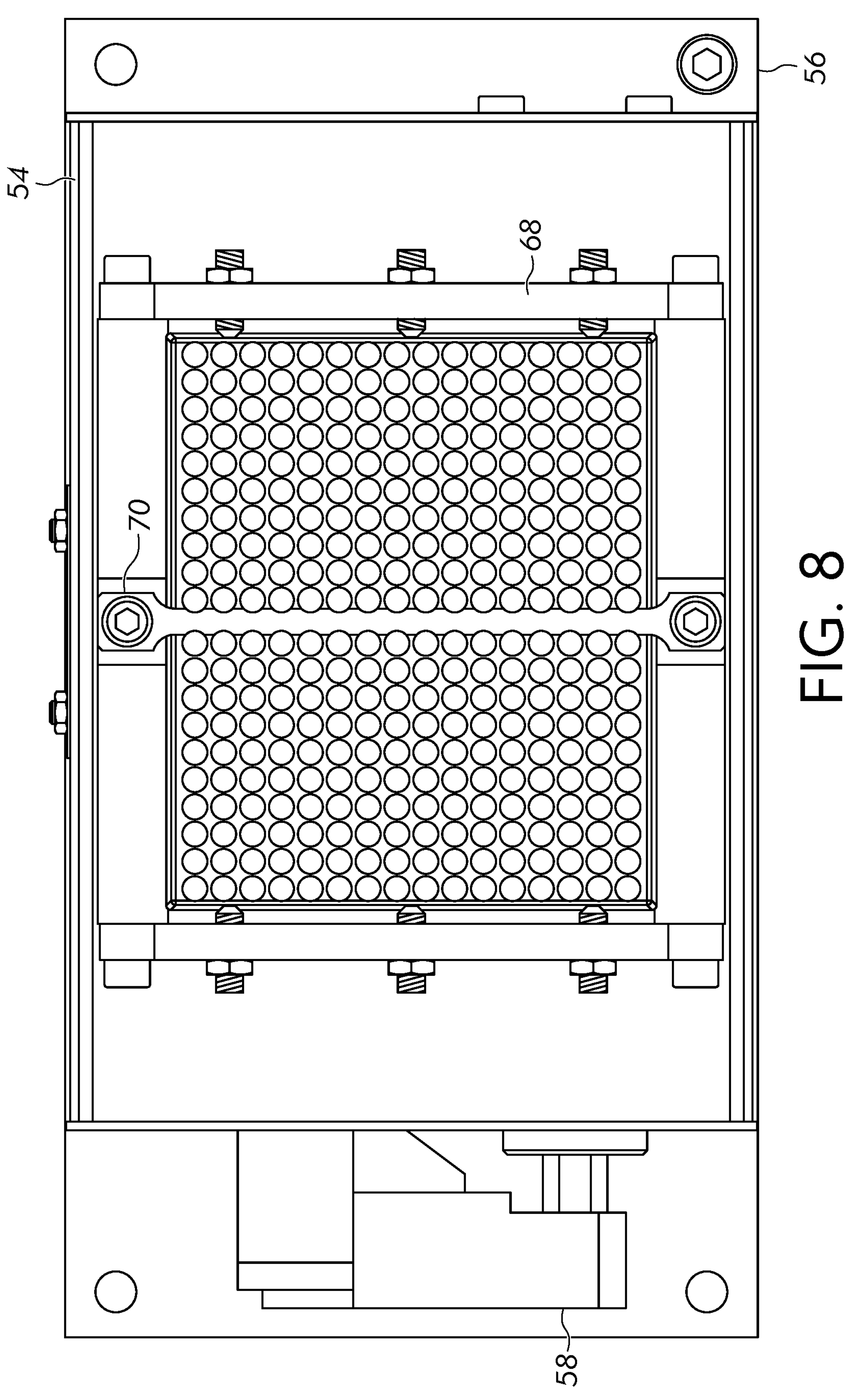
FIG. 8 shows a portion of the charging contact cleaning station.

FIGS. 6-8 show the charging contact cleaning station 34 with its enclosure removed to expose various internal components of the cleaning station. The cleaning station can include a mounting plate 56 to which the actuator 52 and a rail and carriage are mounted for moving the debris catch tray 54 and brushes 44 back and forth. In the example embodiment shown in the figures, the actuator 52 is a pneumatic linear actuator that pushes the brushes 44 back and forth to clean the charging contacts of the charge shoe under the control of the air valves in the control enclosure. However, the actuator 52 need not be a pneumatic actuator and could be, for example, an electric motor or other suitable actuator. The actuator 52 is operatively connected to the debris catch tray 54 and cleaning brushes 44 via a linkage 58 and mobile carriage 60. The actuator 52 moves the linkage 58, which is attached to the mobile carriage 60. The brushes 44 and debris catch tray 54 are mounted on the mobile carriage 60 and are pushed/pulled by the actuator 52 to clean charging contacts on the AGV charge shoe. The carriage 60 rides on a rail 62 that supports the movements of the carriage. In an example embodiment, the carriage 60 and rail 62 form a linear guide. The charging station 34 can include bellows members 64, 66 to keep debris off of various components of the charging station. The bellows members 64, 66 can be formed from an elastomeric material, as would be appreciated by one of ordinary skill in the art. The brushes 44 can be mounted within a frame 68 that allow the brushes to be easily removed and cleaned or replaced. The frame 68 can include a hold down bar 70 to vertically retain the brushes within the frame 68.

Figure 9:
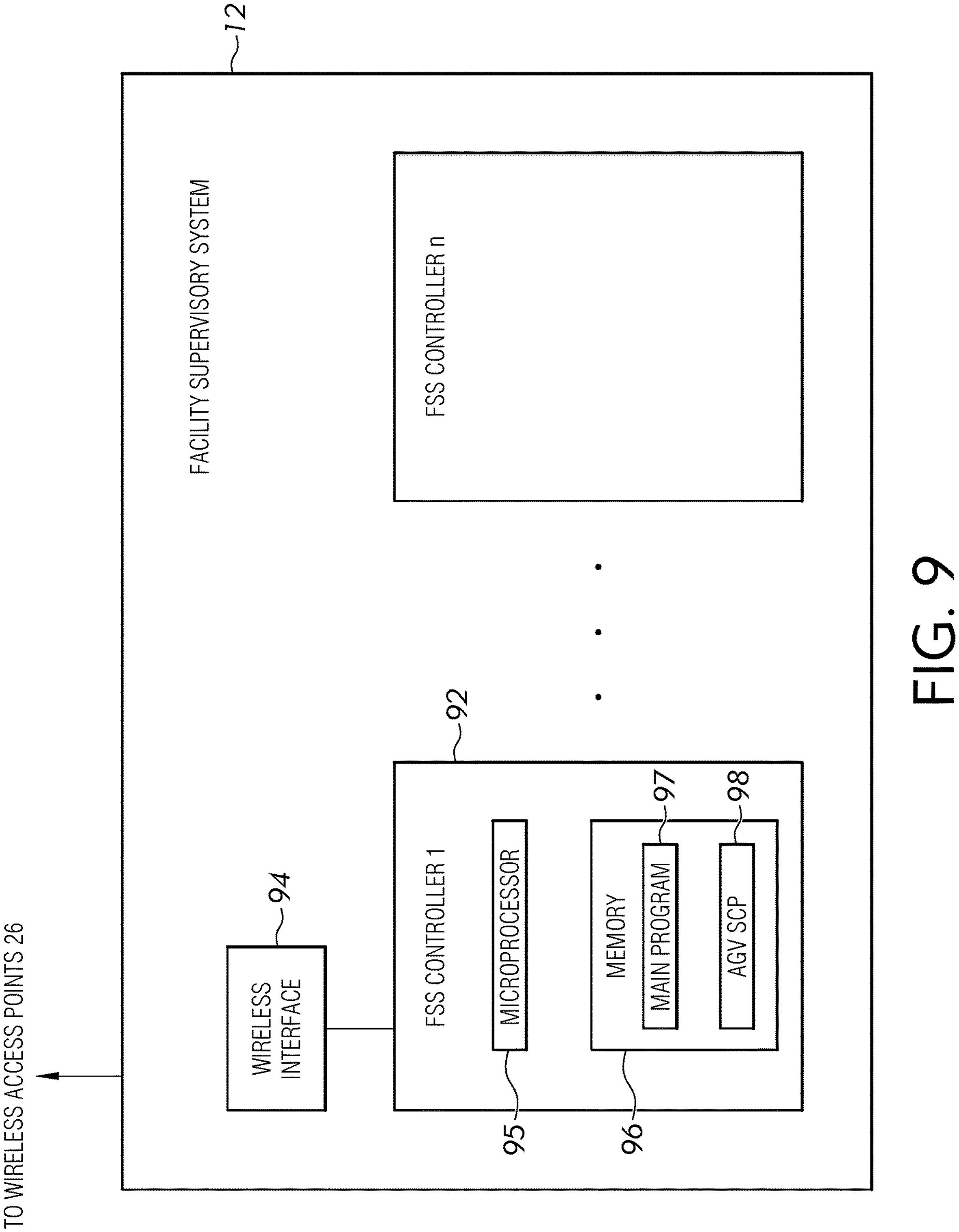
FIG. 9 is a block diagram of an AGV facility supervisory system.

FIG. 9 is a block diagram of an example AGV facility supervisory system 12. The facility supervisory system 12 can include one or more FSS controllers 92 and a wireless interface 94 (e.g., a NIC card and/or router) that is used by the FSS controller(s) 92 to communicate with the AGVs 16 via the facility wireless access points 26. Each FSS controller 92 includes a microprocessor or other electronic processor 95 and computer memory 96 that includes at least one non-transitory, computer-readable medium having stored thereon a main program 97 as well as an integrated or separate AGV supervisory control program (SVP) 98. Both programs comprise computer-readable instructions and are accessible by the processor 95 to execute the programs and provide the functionality described herein. SVP 98 operates to generate AGV commands (e.g., startup, shutdown, proceed to next station, etc.) as well as automatically initiating the cleaning routine by the charging contact cleaning station upon an AGV arriving at the cleaning station. SVP 98 can also receive status and other data supplied by AGVs and/or the charging contact cleaning station. The programming and use of SVP 98 will be apparent to those skilled in the art.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A charging contact cleaner for an automated guided vehicle (AGV), comprising:

a charging contact cleaning station located along a travel path of one or more AGVs, wherein the charging contact cleaning station comprises:

a first cleaning brush;

a second cleaning brush electrically insulated from the first cleaning brush during a charging contact cleaning operation; and an actuator operatively connected to the first cleaning brush and the second cleaning brush, wherein the first cleaning brush and the second cleaning brush, respectively, simultaneously engage first and second charging contacts deployed from the AGV at the charging contact cleaning station, and wherein the first cleaning brush and the second cleaning brush are automatically moved by the actuator relative to the first and second charging contacts for a predetermined cleaning duration to clean respective surfaces of the first and second charging contacts.

2. The charging contact cleaner for an AGV of claim 1, wherein the first cleaning brush and the second cleaning brush include metallic wire bristles.

3. A charging contact cleaner for an automated guided vehicle (AGV), comprising:

a charging contact cleaning station located along a travel path of one or more AGVs, wherein the charging contact cleaning station comprises:

at least one cleaning brush; and an actuator operatively connected to the at least one cleaning brush, wherein the at least one cleaning brush simultaneously engages first and second charging contacts deployed from the AGV at the charging contact cleaning station, and wherein the at least one cleaning brush is automatically moved by the actuator relative to the first and second charging contacts for a predetermined cleaning duration to clean respective surfaces of the first and second charging contacts, wherein the charging contact cleaning station further comprises:

a flush-to-floor enclosure; and a debris catch tray located within the flush-to-floor enclosure, wherein the debris catch tray is operatively connected to the actuator, and the at least one cleaning brush is mounted within the debris catch tray.

4. The charging contact cleaner for an AGV of claim 3, wherein the at least one cleaning brush comprises a first cleaning brush and a second cleaning brush electrically insulated from the first cleaning brush.

5. The charging contact cleaner for an AGV of claim 3, wherein the actuator is a pneumatic linear actuator.

6. The charging contact cleaner for an AGV of claim 5, further comprising a mobile carriage and a rail that supports movements of the carriage, wherein the actuator is operatively connected to the first cleaning brush and the second cleaning brush through the mobile carriage.

7. The charging contact cleaner for an AGV of claim 3, wherein the actuator comprises a motor.

8. The charging contact cleaner for an AGV of claim 3, wherein the flush-to-floor enclosure includes a cover plate, and the cover plate has an opening aligned with the at least one cleaning brush such that the at least one cleaning brush is exposed when the cover plate is attached to the flush-to-floor enclosure.

9. A charging contact cleaner for an automated guided vehicle (AGV), comprising:

a charging contact cleaning station located along a travel path of one or more AGVs and recessed in a floor on which the AGV travels, wherein the charging contact cleaning station comprises:

a flush-to-floor enclosure;

a first cleaning brush located within the flush-to-floor enclosure;

a second cleaning brush located within the flush-to-floor enclosure, wherein the second cleaning brush is electrically insulated from the first cleaning brush during a charging contact cleaning operation; and an actuator located within the flush-to-floor enclosure and operatively connected to the first cleaning brush and the second cleaning brush, wherein the first cleaning brush and the second cleaning brush, respectively, simultaneously engage first and second charging contacts deployed from the AGV at the charging contact cleaning station, and wherein the first cleaning brush and the second cleaning brush are automatically moved by the actuator relative to the first and second charging contacts to clean respective surfaces of the first and second charging contacts.

10. The charging contact cleaner for an AGV of claim 9, wherein the first cleaning brush and the second at least one cleaning brush include metallic wire bristles.

11. A charging contact cleaner for an automated guided vehicle (AGV), comprising:

a charging contact cleaning station located along a travel path of one or more AGVs and recessed in a floor on which the AGV travels, wherein the charging contact cleaning station comprises:

a flush-to-floor enclosure;

at least one cleaning brush located within the flush-to-floor enclosure; and an actuator located within the flush-to-floor enclosure and operatively connected to the at least one cleaning brush, wherein the at least one cleaning brush simultaneously engages first and second charging contacts deployed from the AGV at the charging contact cleaning station, and wherein the at least one cleaning brush is automatically moved by the actuator relative to the first and second charging contacts to clean respective surfaces of the first and second charging contacts, wherein the actuator is a pneumatic linear actuator; and a mobile carriage and a rail that supports movements of the carriage, wherein the actuator is operatively connected to the at least one cleaning brush through the mobile carriage; and a debris catch tray located within the flush-to-floor enclosure, wherein the debris catch tray is attached to the mobile carriage, and the at least one cleaning brush is mounted within the debris catch tray.

12. The charging contact cleaner for an AGV of claim 11, wherein the at least one cleaning brush comprises a first cleaning brush and a second cleaning brush electrically insulated from the first cleaning brush.

13. A charging contact cleaner for an automated guided vehicle (AGV), comprising:

a charging contact cleaning station located along a travel path of one or more AGVs and recessed in a floor on which the AGV travels, wherein the charging contact cleaning station comprises:

a flush-to-floor enclosure;

at least one cleaning brush located within the flush-to-floor enclosure; and an actuator located within the flush-to-floor enclosure and operatively connected to the at least one cleaning brush, wherein the at least one cleaning brush simultaneously engages first and second charging contacts deployed from the AGV at the charging contact cleaning station, and wherein the at least one cleaning brush is automatically moved by the actuator relative to the first and second charging contacts to clean respective surfaces of the first and second charging contacts, wherein the flush-to-floor enclosure includes a cover plate, and the cover plate has an opening aligned with the at least one cleaning brush such that the at least one cleaning brush is exposed when the cover plate is attached to the flush-to-floor enclosure.

14. The charging contact cleaner for an AGV of claim 13, wherein the actuator is a pneumatic linear actuator.

15. The charging contact cleaner for an AGV of claim 14, further comprising a mobile carriage and a rail that supports movements of the carriage, wherein the actuator is operatively connected to the at least one cleaning brush through the mobile carriage.

16. The charging contact cleaner for an AGV of claim 13, wherein the actuator comprises a motor.

17. An automated guided vehicle (AGV) fleet system, comprising:

a plurality AGVs located within a facility, each AGV having first and second deployable charging contacts for receiving charging current to charge a battery of the AGV;

a charging contact cleaning station located along a travel path of the plurality of AGVs within the facility; and a facility supervisory system in communication with the plurality of AGVs and the charging contact cleaning station, wherein the charging contact cleaning station comprises at least one cleaning brush and an actuator operatively connected to the at least one cleaning brush, and wherein the facility supervisory system is configured to automatically initiate a cleaning routine by the charging contact cleaning station upon an AGV arriving at the charging contact cleaning station, and wherein during the cleaning routine the at least one cleaning brush simultaneously engages the first and second charging contacts deployed from the AGV, and the at least one cleaning brush is automatically moved by the actuator relative to the first and second charging contacts to clean respective surfaces of the first and second charging contacts.

18. The AGV fleet system of claim 17, wherein the cleaning routine has a predetermined cleaning duration of less than 30 seconds.

19. The AGV fleet system of claim 17, wherein the AGV is configured to determine its arrival at the charging contact cleaning station and communicate its arrival to the facility supervisory system.

20. The AGV fleet system of claim 19, wherein the AGV determines it arrival at the charging contact cleaning station from a near-field communication signal.

21. The AGV fleet system of claim 17, wherein a charging circuit of the AGV is disabled while the first and second charging contacts are deployed from the AGV during the cleaning routine.

22. The AGV fleet system of claim 17, wherein the at least one cleaning brush includes a plastic base and metallic wire bristles.

23. The AGV fleet system of claim 17, wherein the actuator is a pneumatic linear actuator.

24. The AGV fleet system of claim 23, further comprising a mobile carriage and a rail that supports movements of the carriage, wherein the actuator is operatively connected to the at least one cleaning brush through the mobile carriage.

25. The AGV fleet system of claim 17, wherein the charging contact cleaning station further comprises:

a flush-to-floor enclosure; and a debris catch tray located within the flush-to-floor enclosure, wherein the debris catch tray is operatively connected to the actuator, and the at least one cleaning brush is mounted within the debris catch tray.

26. The AGV fleet system of claim 25, wherein the flush-to-floor enclosure includes a cover plate, and the cover plate has an opening aligned with the at least one cleaning brush such that the at least one cleaning brush is exposed when the cover plate is attached to the flush-to-floor enclosure.

* * * * *